United States Patent
Medhat (10) Patent No.: US 7,327,737 B2
(45) Date of Patent: Feb. 5, 2008

(54) METHOD AND APPARATUS TO CONTROL CELL SUBSTITUTION

(75) Inventor: Khalid M. Medhat, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 793 days.

(21) Appl. No.: 10/754,016

(22) Filed: Jan. 8, 2004

(65) Prior Publication Data

US 2004/0141492 A1    Jul. 22, 2004

Related U.S. Application Data

(63) Continuation of application No. 09/464,295, filed on Dec. 15, 1999, now Pat. No. 6,704,314.

(51) Int. Cl.
*H04L 12/26* (2006.01)

(52) U.S. Cl. .................. 370/395.1; 370/352; 370/410

(58) Field of Classification Search ............... None
See application file for complete search history.

(56) References Cited

U.S. PATENT DOCUMENTS

| | | | |
|---|---|---|---|
| 4,491,945 A | 1/1985 | Turner | |
| 4,683,584 A | 7/1987 | Chang et al. | |
| 4,686,669 A | 8/1987 | Chang | |
| 4,686,701 A | 8/1987 | Ahmad et al. | |
| 4,720,850 A | 1/1988 | Oberlander et al. | |
| 4,730,312 A | 3/1988 | Johnson et al. | |
| 4,736,364 A | 4/1988 | Basso et al. | |
| 4,748,658 A | 5/1988 | Gopal et al. | |
| 4,757,526 A | 7/1988 | Foster et al. | |
| 4,763,317 A | 8/1988 | Lehman et al. | |
| 4,853,955 A | 8/1989 | Thorn et al. | |
| 4,970,721 A | 11/1990 | Aczel et al. | |
| 4,991,169 A | 2/1991 | Davis et al. | |
| 4,991,172 A | 2/1991 | Cidon et al. | |
| 5,003,584 A | 3/1991 | Benyacar et al. | |
| 5,029,199 A | 7/1991 | Jones et al. | |
| 5,048,081 A | 9/1991 | Gavaras et al. | |
| 5,051,983 A | 9/1991 | Kammerl | |
| 5,084,816 A | 1/1992 | Boese et al. | |

(Continued)

FOREIGN PATENT DOCUMENTS

EP    0439098    7/1991

(Continued)

OTHER PUBLICATIONS

Kuribayashi, Shin-Ichi; Advanced Signaling Protocol for Broadband ISDN Services; Electronics and Communications in Japan; Part 1, vol. 78, No. 1, pp. 1-12, 1995.

(Continued)

*Primary Examiner*—Bob A. Phunkulh (57) ABSTRACT

A communication system determines a cell substitution method based on information for a call to improve call quality. The communication system receives information for the call. The communication system then determines the cell substitution method based on the information. The communication system generates an instruction to use the cell substitution method for the call. The communication system advantageously uses an optimal cell substitution method for each different type of call. The communication system uses the optimal cell substitution method when a cell is lost or misinserted.

20 Claims, 8 Drawing Sheets

U.S. PATENT DOCUMENTS

| | | |
|---|---|---|
| 5,089,954 A | 2/1992 | Rago |
| 5,115,426 A | 5/1992 | Spanke |
| 5,115,427 A | 5/1992 | Johnson, Jr. et al. |
| 5,185,743 A | 2/1993 | Murayama et al. |
| 5,204,857 A | 4/1993 | Obara |
| 5,251,255 A | 10/1993 | Epley |
| 5,258,979 A | 11/1993 | Oomuro et al. |
| 5,268,895 A | 12/1993 | Topper |
| 5,271,010 A | 12/1993 | Miyake et al. |
| 5,274,635 A | 12/1993 | Rahman et al. |
| 5,274,698 A | 12/1993 | Jang |
| 5,278,972 A | 1/1994 | Baker et al. |
| 5,282,244 A | 1/1994 | Fuller et al. |
| 5,289,472 A | 2/1994 | Cho |
| 5,291,492 A | 3/1994 | Andrews et al. |
| 5,297,147 A | 3/1994 | Shimokasa |
| 5,327,421 A | 7/1994 | Hiller et al. |
| 5,339,318 A | 8/1994 | Tanaka et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,363,433 A | 11/1994 | Isono |
| 5,375,124 A | 12/1994 | D'Ambrogio et al. |
| 5,377,186 A | 12/1994 | Wegner et al. |
| 5,392,402 A | 2/1995 | Robrock, II |
| 5,394,463 A | 2/1995 | Fischell et al. |
| 5,420,858 A | 5/1995 | Marshall et al. |
| 5,422,882 A | 6/1995 | Hiller et al. |
| 5,425,090 A | 6/1995 | Orriss |
| 5,428,609 A | 6/1995 | Eng et al. |
| 5,434,852 A | 7/1995 | La Porta et al. |
| 5,434,981 A | 7/1995 | Lenihan et al. |
| 5,438,527 A | 8/1995 | Feldbaumer et al. |
| 5,438,570 A | 8/1995 | Karras et al. |
| 5,440,563 A | 8/1995 | Isidoro et al. |
| 5,440,626 A | 8/1995 | Boyle et al. |
| 5,444,713 A | 8/1995 | Backaus et al. |
| 5,452,297 A | 9/1995 | Hiller et al. |
| 5,452,350 A | 9/1995 | Reynolds et al. |
| 5,457,684 A | 10/1995 | Bharucha et al. |
| 5,459,722 A | 10/1995 | Sherif |
| 5,469,501 A | 11/1995 | Otsuka |
| 5,473,677 A | 12/1995 | D'Amato et al. |
| 5,473,679 A | 12/1995 | La Porta et al. |
| 5,483,527 A | 1/1996 | Doshi et al. |
| 5,485,455 A | 1/1996 | Dobbins et al. |
| 5,495,484 A | 2/1996 | Self et al. |
| 5,506,894 A | 4/1996 | Billings et al. |
| 5,509,010 A | 4/1996 | La Porta et al. |
| 5,519,690 A | 5/1996 | Suzuka et al. |
| 5,519,707 A | 5/1996 | Subramanian et al. |
| 5,530,724 A | 6/1996 | Abrams et al. |
| 5,533,115 A | 7/1996 | Hollenbach et al. |
| 5,537,461 A | 7/1996 | Bridges et al. |
| 5,541,917 A | 7/1996 | Farris |
| 5,544,163 A | 8/1996 | Madonna |
| 5,550,834 A | 8/1996 | D'Ambrogio et al. |
| 5,550,914 A | 8/1996 | Clarke et al. |
| 5,563,939 A | 10/1996 | La Porta et al. |
| 5,566,173 A | 10/1996 | Steinbrecher |
| 5,568,475 A | 10/1996 | Doshi et al. |
| 5,577,037 A | 11/1996 | Takatori et al. |
| 5,579,311 A | 11/1996 | Chopping et al. |
| 5,586,177 A | 12/1996 | Farris et al. |
| 5,590,133 A | 12/1996 | Billström et al. |
| 5,592,477 A | 1/1997 | Farris et al. |
| 5,600,643 A | 2/1997 | Robrock, II |
| 5,610,977 A | 3/1997 | Williams et al. |
| 5,619,561 A | 4/1997 | Reese |
| 5,623,491 A | 4/1997 | Skoog |
| 5,635,980 A | 6/1997 | Lin et al. |
| 5,636,261 A | 6/1997 | Fils |
| 5,640,446 A | 6/1997 | Everett et al. |
| 5,666,399 A | 9/1997 | Bales et al. |
| 5,673,262 A | 9/1997 | Shimizu |
| 5,689,550 A | 11/1997 | Garson et al. |
| 5,689,555 A | 11/1997 | Sonnenberg |
| 5,701,301 A | 12/1997 | Weisser, Jr. |
| 5,703,876 A | 12/1997 | Christie |
| 5,703,880 A | 12/1997 | Miura |
| 5,706,286 A | 1/1998 | Reiman et al. |
| 5,710,769 A | 1/1998 | Anderson et al. |
| 5,715,239 A | 2/1998 | Hyodo et al. |
| 5,745,553 A | 4/1998 | Mirville et al. |
| 5,751,706 A | 5/1998 | Land et al. |
| 5,765,108 A | 6/1998 | Martin et al. |
| 5,774,530 A | 6/1998 | Montgomery et al. |
| 5,774,675 A | 6/1998 | Uchida |
| 5,784,371 A | 7/1998 | Iwai |
| 5,793,765 A | 8/1998 | Boer et al. |
| 5,793,857 A | 8/1998 | Barnes et al. |
| 5,802,045 A | 9/1998 | Kos et al. |
| 5,825,780 A | 10/1998 | Christie |
| 5,828,666 A | 10/1998 | Focsaneanu et al. |
| 5,850,391 A | 12/1998 | Essigmann |
| 5,862,334 A | 1/1999 | Schwartz et al. |
| 5,867,495 A | 2/1999 | Elliott et al. |
| 5,867,562 A | 2/1999 | Scherer |
| 5,867,571 A | 2/1999 | Borchering |
| 5,872,779 A | 2/1999 | Vaudreuil |
| 5,872,785 A | 2/1999 | Kienberger |
| 5,884,262 A | 3/1999 | Wise et al. |
| 5,892,764 A | 4/1999 | Riemann et al. |
| 5,915,009 A | 6/1999 | Williams et al. |
| 5,920,562 A | 7/1999 | Christie et al. |
| 5,926,464 A | 7/1999 | Fraser |
| 5,940,393 A | 8/1999 | Duree et al. |
| 5,940,491 A | 8/1999 | Anderson et al. |
| 5,940,492 A | 8/1999 | Galloway et al. |
| 5,949,791 A | 9/1999 | Byers et al. |
| 5,949,871 A | 9/1999 | Kabay et al. |
| 5,956,334 A | 9/1999 | Chu et al. |
| RE36,416 E | 11/1999 | Szlam et al. |
| 5,991,301 A | 11/1999 | Christie |
| 5,999,525 A | 12/1999 | Krishnaswamy et al. |
| 5,999,594 A | 12/1999 | Mizoguchi et al. |
| 6,002,689 A | 12/1999 | Christie et al. |
| 6,014,378 A | 1/2000 | Christie et al. |
| 6,026,091 A | 2/2000 | Christie et al. |
| 6,031,840 A | 2/2000 | Christie et al. |
| 6,034,950 A | 3/2000 | Sauer et al. |
| 6,038,218 A | 3/2000 | Otsuka et al. |
| 6,069,890 A | 5/2000 | White et al. |
| 6,088,749 A | 7/2000 | Hebert et al. |
| 6,137,800 A | 10/2000 | Wiley et al. |
| 6,141,339 A | 10/2000 | Kaplan et al. |
| 6,144,658 A * | 11/2000 | Lebizay et al. ............. 370/352 |
| 6,169,735 B1 | 1/2001 | Allen, Jr. et al. |
| 6,175,574 B1 | 1/2001 | Lewis |
| 6,181,703 B1 | 1/2001 | Christie et al. |
| 6,208,618 B1 * | 3/2001 | Kenney et al. ............. 370/216 |
| 6,249,572 B1 | 6/2001 | Brockman et al. |
| 6,324,173 B1 | 11/2001 | Deschaine et al. |
| 6,324,179 B1 | 11/2001 | Doshi et al. |
| 6,324,279 B1 | 11/2001 | Kalmanek, Jr. et al. |
| 6,327,270 B1 | 12/2001 | Christie et al. |
| 6,377,673 B1 | 4/2002 | Cho et al. |
| 6,430,195 B1 | 8/2002 | Christie et al. |
| 6,487,200 B1 * | 11/2002 | Fraser ........................ 370/389 |
| 6,496,512 B1 | 12/2002 | Medhat |
| 6,546,003 B1 | 4/2003 | Farris |
| 6,546,442 B1 | 4/2003 | Davis et al. |
| 6,597,701 B1 | 7/2003 | Howell |
| 6,667,982 B2 | 12/2003 | Christie et al. |

| | | | |
|---|---|---|---|
| 6,690,674 B1 | 2/2004 | Christie et al. | |
| 6,765,903 B1 | 7/2004 | Allen, Jr. et al. | |
| 6,785,282 B1 | 8/2004 | Gardner | |
| 6,847,611 B1 | 1/2005 | Chase et al. | |
| 2003/0007492 A1 | 1/2003 | Christie et al. | |
| 2004/0193329 A1 | 9/2004 | Ransom et al. | |
| 2005/0163110 A1 | 7/2005 | Howell | |
| 2006/0023676 A1 | 2/2006 | Whitmore et al. | |
| 2006/0251089 A1 | 11/2006 | Medhat | |

FOREIGN PATENT DOCUMENTS

| | | |
|---|---|---|
| EP | 0 488 399 | 6/1992 |
| HU | 71152 | 11/1995 |
| JP | 1013534 | 1/1989 |
| JP | 1300738 | 12/1989 |
| JP | 2215247 | 8/1990 |
| JP | 4180324 | 6/1992 |
| JP | 4196635 | 7/1992 |
| JP | 5327751 | 12/1993 |
| JP | 6006320 | 1/1994 |
| JP | 6209365 | 7/1994 |
| JP | 7177061 | 7/1995 |
| JP | 7250099 | 9/1995 |
| JP | 8149137 | 6/1996 |
| WO | WO9214321 | 8/1992 |

OTHER PUBLICATIONS

Hungarian office action dated Jun. 23, 1999 citing Hungarian patent No. HU170127 for Hungarian Application No. P9900232; 2 pages.

Russian office action dated Apr. 22, 2002 citing Russian patent Nos. RU2013011 and RU2007880 for Russian Application No. 99112956; 6 pages.

Hiroshi Ishii and Masatoshi Kawarasaki; B-ISDN Signalling Protocol Capabilities; NTT Telecommunication Networks Laboratories; 1989; pp. 41.2.1-41.2.5.

Manu Bahl, et al.; "The Evolving Intelligent Interexchange Network—An SS7 Perspective;" Proceedings of the IEEE; Apr. 1992; pp. 637-643; vol. 80, No. 4.

IBM International Technical Support Organization; "Networking BroadBand Services (NBBS) Architecture Tutorial;" Jun. 1995; 248 pages; First Edition; Research Triangle Park, North Carolina, USA.

David J. Wright; "Voice over ATM: An Evaluation of Network Architecture Alternatives;" IEEE Network; Sep./Oct. 1996; pp. 22-27.

* cited by examiner

METHOD AND APPARATUS TO CONTROL CELL SUBSTITUTION

RELATED APPLICATIONS

This patent application is a continuation of U.S. patent application Ser. No. 09/464,295, which was filed on Dec. 15, 1999 now U.S. Pat. No. 6,704,314; which is entitled "METHOD AND APPARATUS TO CONTROL CELL SUBSTITUTION"; and which is hereby incorporated by reference into this patent application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a system that controls cell substitution for a call.

2. Description of the Prior Art

When carrying calls, telecommunication systems break down calls into packets, blocks, frames or cells depending on the protocol of the data network. The telecommunication systems lose some cells for various reasons such as problems with telecommunication devices. The telecommunication systems use cell substitution methods to compensate for these lost cells. Some examples of cell substitution methods are white noise, repeat last cell, and silence. White noise is typically background noise inserted because of users' expectation of some noise. Repeat last cell is another method of inserting cells based on a calculation of previous cells.

Figure 1:
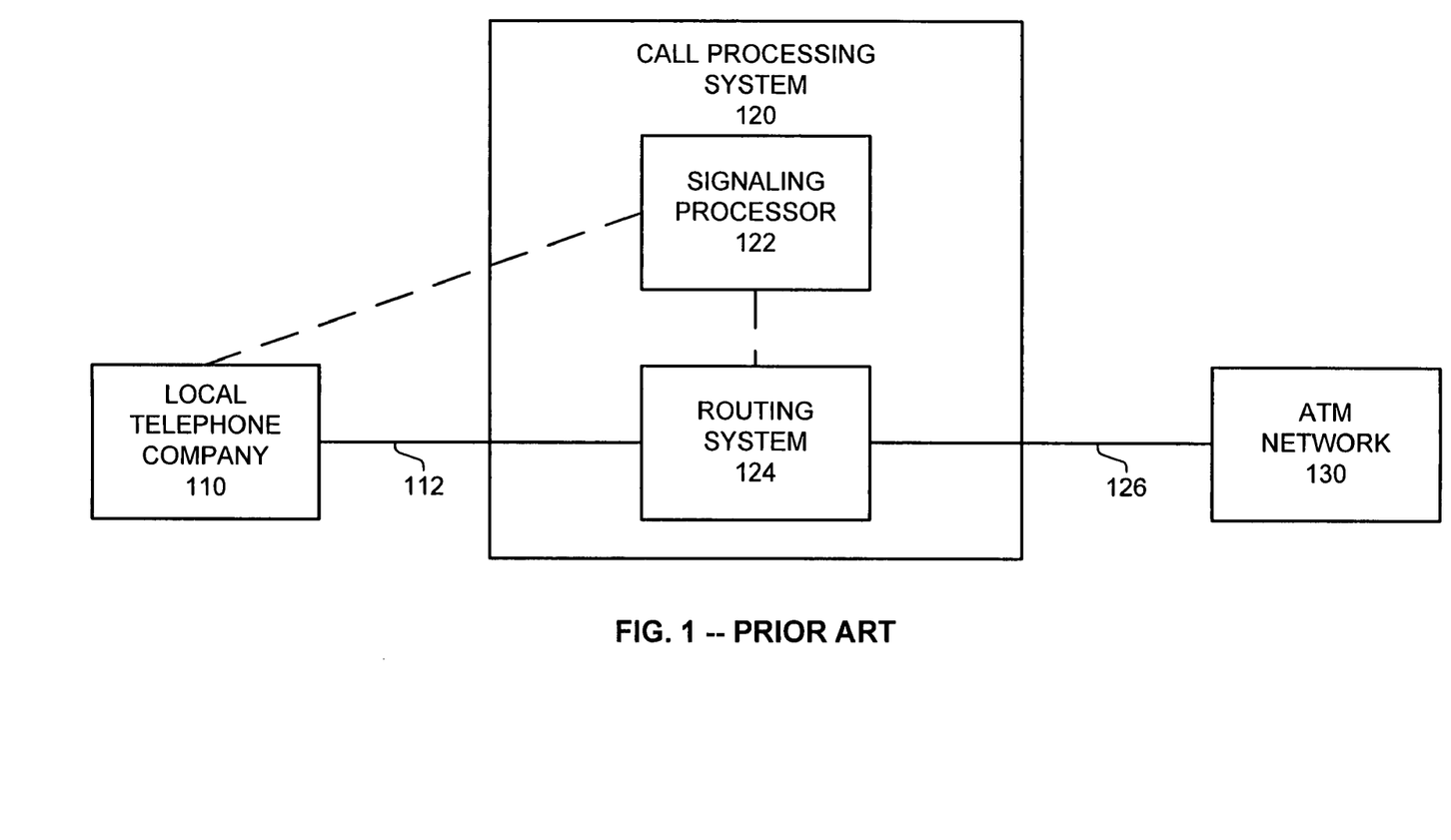
FIG. 1 is a system level block diagram of a prior solution for using a cell substitution method.
Figure 2:
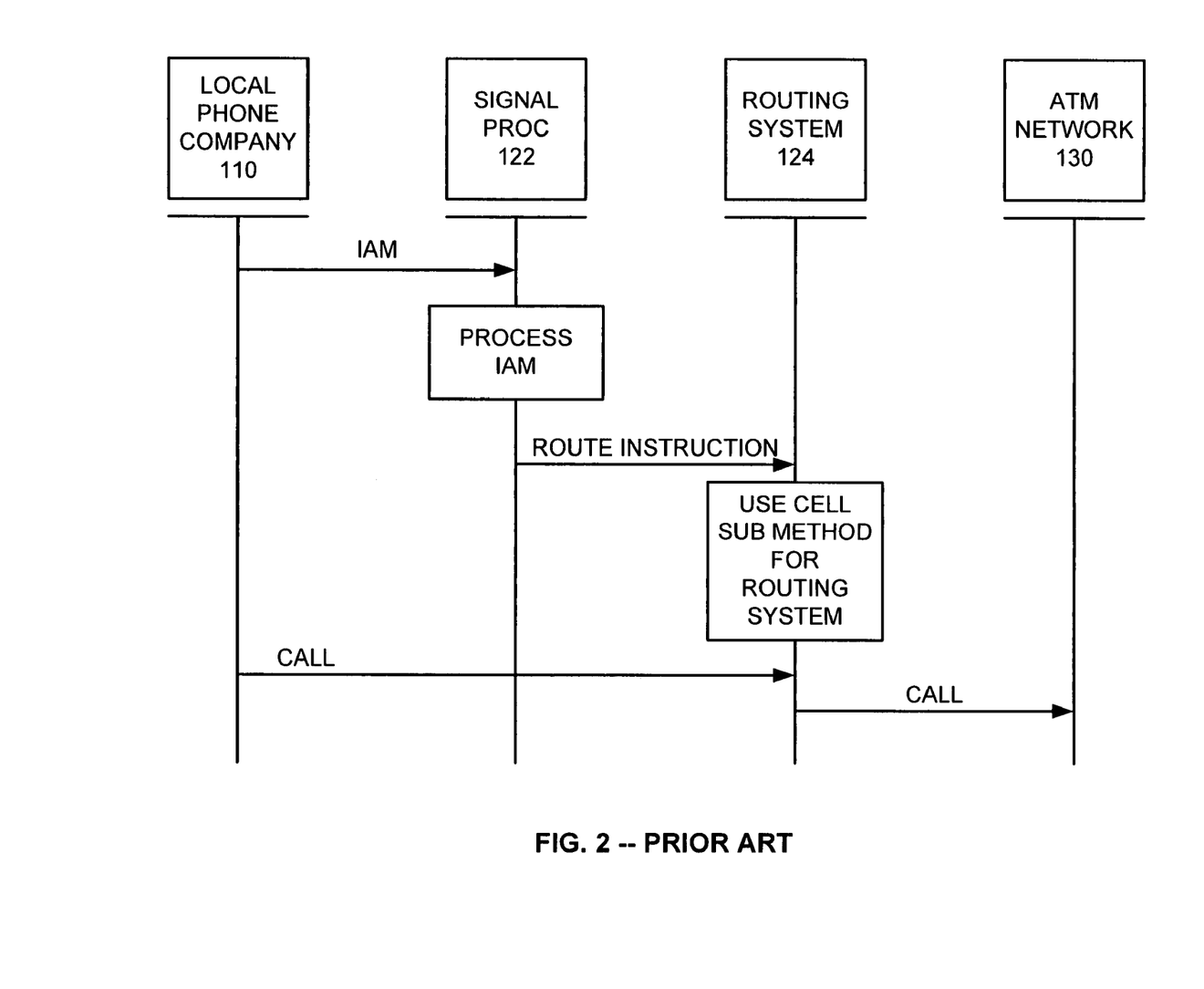
FIG. 2 is a message sequence chart of a prior solution for using a cell substitution method.

FIG. 1 depicts a system level block diagram of a prior solution for using a cell substitution method. In FIG. 1, a call processing system 120 is disclosed in a pending U.S. patent application Ser. No. 09/435,534, entitled "System and Method for Processing a Call," filed on Nov. 5, 1999, which is hereby incorporated by reference. FIG. 2 depicts a message sequence chart of a prior solution for using a cell substitution method. A local telephone company 110 transmits an Initial Address Message (IAM) in Signaling System #7 (SS7) for a call to a signaling processor 122. The signaling processor 122 receives the IAM and processes the IAM. The signaling processor 122 then generates and transmits a route instruction for a routing system 124. Subsequent signaling messages for call set up are not shown for the sake of clarity.

The routing system 124 receives the route instruction from the signaling process 122. The routing system 124 uses one default cell substitution method that is provisioned by the user for all calls received from the local telephone company 110. The routing system 124 then receives the call from the local telephone company 110 over a call link 1112. The routing system 124 routes the call to an Asynchronous Transfer Mode (ATM) network 130 based on the route instruction. The routing system 124 uses the cell substitution method for lost or misinserted cells for the duration of the call.

One problem is that one cell substitution method does not provide the best performance for all different call types. The call types could be voice or data calls. Data calls are calls that carry data using modem, facsimile, or Switched 56. Different call types may use Signaling System #7, Integrated Services Digital Network, or Channel Associated Signaling for signaling and/or to carry the calls. Studies have shown that voice calls are optimized when white noise is inserted for lost or misinserted cells. Studies have also shown that data call performance improves when the repeat last cell method is used to substitute for lost or misinserted cells.

One cell substitution method for all calls results in diminished quality for certain call types that perform better with another cell substitution method. For example, data calls lose some data using a cell substitution method such as white noise that is optimal for voice calls. To improve call quality, telecommunication service providers need to utilize different cell substitution methods for different type of calls.

SUMMARY OF THE INVENTION

The invention solves the above problem by determining a cell substitution method based on information for a call. A communication system advantageously uses an optimal cell substitution method for each different type of call. Thus, optimizing the performance of each call type with the appropriate optimal cell substitution method improves the quality for all call types. The communication system receives information for the call. The communication system then determines the cell substitution method based on the information. The communication system generates an instruction to use the cell substitution method for the call. In one embodiment of the invention, the communication system determines a call type based on the information for the call and determines the cell substitution method based on the call type. In another embodiment, the communication system uses the cell substitution method for the call based on the instruction.

DETAILED DESCRIPTION OF THE INVENTION

Communication System to Control Cell Substitution

Figure 3:
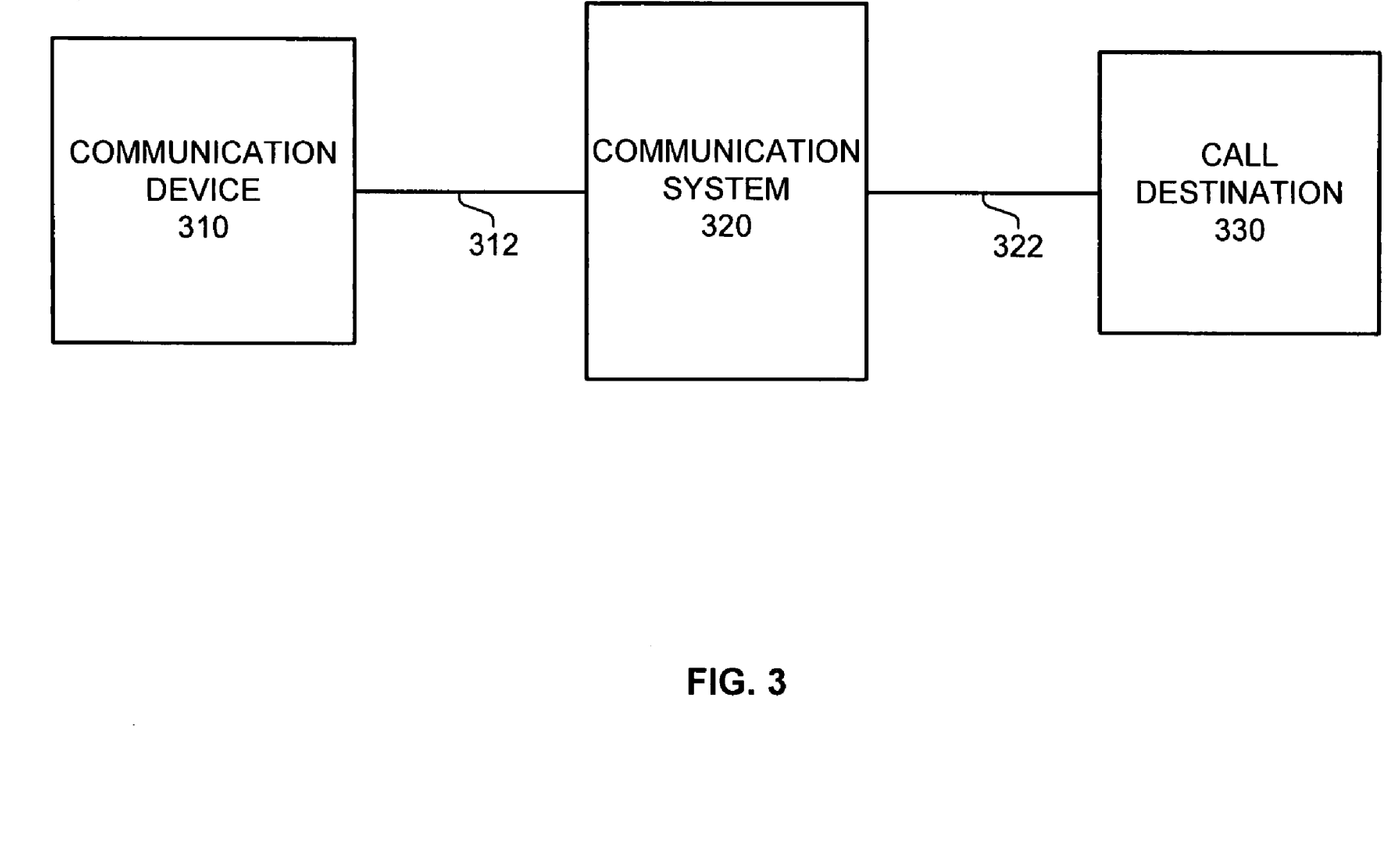
FIG. 3 is a system level block diagram of an example of the invention.

FIG. 3 depicts a system level block diagram of an example of the invention. In FIG. 3, a communication device 310 is connected to a communication system 320 by a call link 312. The communication system 320 is coupled to a call destination 330 by a call link 322.

The communication device 310 could be any communications device configured to transmit information for a call to the communication system 320. The information for the call could be any data, signaling, or information related to the call. The information for the call could be the call itself. One example of information for the call is an Initial Address Message (IAM) in Signaling System #7. The call destination 330 could be any system configured to receive calls from the communication system 320.

The communication system 320 could be any system configured to (1) receive information for the call, (2) determine a cell substitution method based on the information, and (3) generate an instruction to use the cell substitution method for the call. The cell substitution method could be any method or process used to compensate for lost or misinserted cells in a telecommunication service. In other embodiments of the invention the cells are packets. Some examples of the cell substitution methods are white noise, repeat last cell, and silence.

In operation, the communication device 310 transmits the information for the call to the communication system 320. The communication system 320 receives the information for the call. The communication system 320 then determines the cell substitution method based on the information. The communication system 320 generates an instruction to use the determined cell substitution method for the call.

Call Processing System to Control Cell Substitution

FIGS. 4-8 disclose one embodiment of the invention, but the invention is not restricted to the configuration provided below. Those skilled in the art will appreciate numerous variations in a communication system configuration and operation that are within the scope of the invention. Those skilled in the art will also appreciate how the principles illustrated in this example can be used in other examples of the invention. A particular reference number in one figure refers to the same element in all of the other figures.

Figure 4:
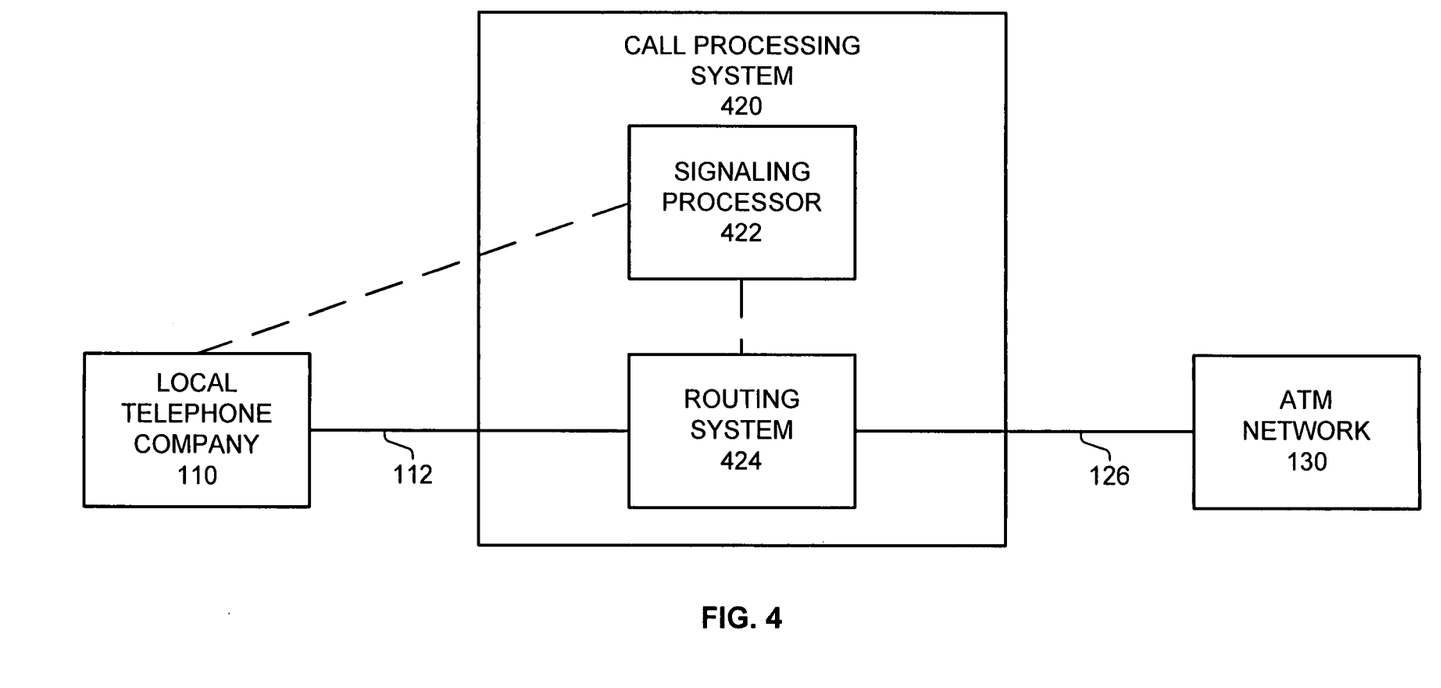
FIG. 4 is a system level block diagram including a call processing system in an example of the invention.

FIG. 4 depicts a system level block diagram including the call processing system 420 in an example of the invention. In FIG. 4, a call processing system 420 comprises a signaling processor 422 and a routing system 424. The signaling processor 422 is connected to a local telephone company 110 and the routing system 424. The routing system 424 is connected to the local telephone company 110 via a call link 112. The routing system 424 is also connected to an Asynchronous Transfer Mode (ATM) network 130 via a call link 126. Those skilled in the art understand that other call processing systems can be connected to the call processing system 420 and either the local telephone company 110 or the ATM network 130. The numerous variations of multiple call processing systems are not shown for the sake of clarity.

Figure 5:
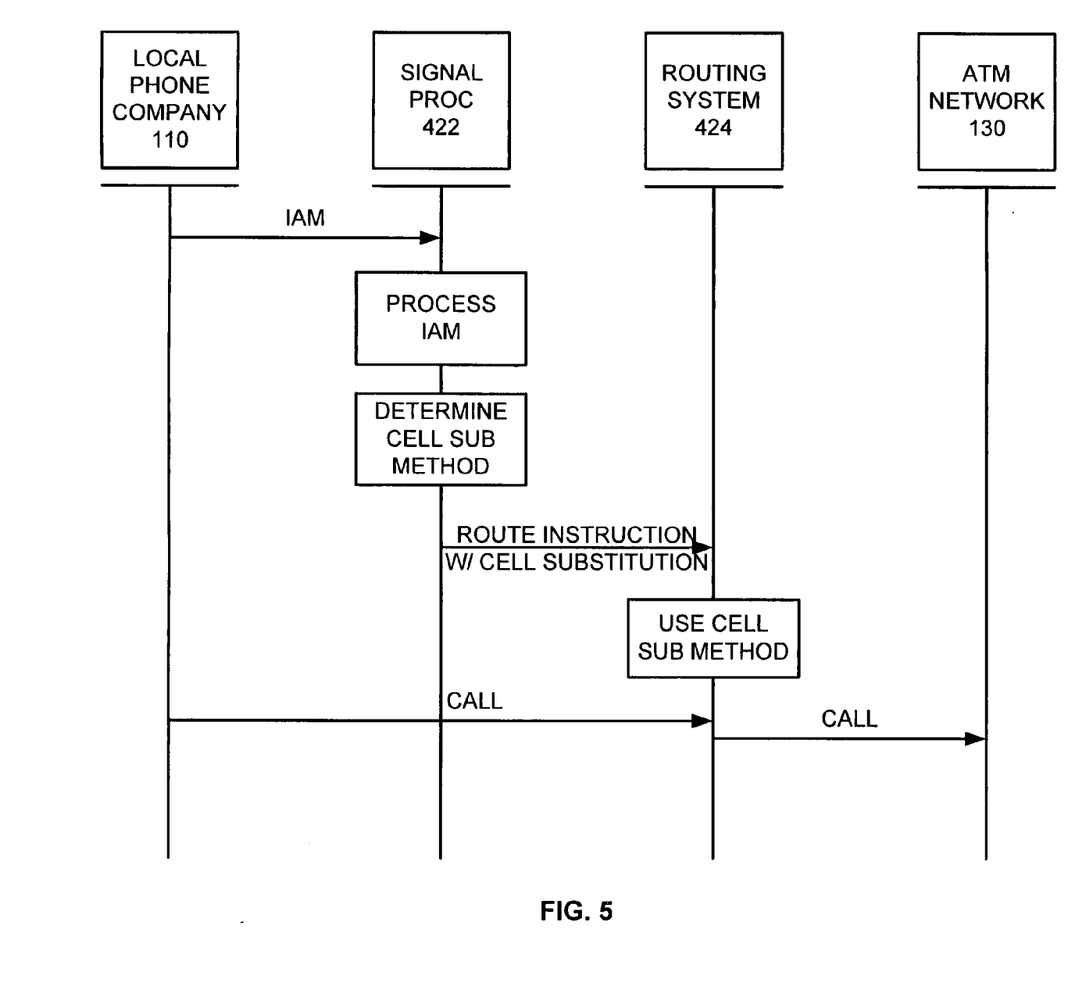
FIG. 5 is a message sequence chart for a cell substitution method selected from an initial address message in an example of the invention.

FIG. 5 depicts a message sequence chart for a cell substitution method selected from an initial address message in an example of the invention. The local telephone company 110 transmits an IAM in SS7 for a call to the signaling processor 422. The signaling processor 422 receives the IAM and processes the LAM. The signaling processor 422 determines the call type from the IAM message. Some examples of call types are voice and data calls. Data calls are calls that carry data using modem, facsimile, or Switched 56. Different call types may use Signaling System #7, Integrated Services Digital Network, or Channel Associated Signaling for signaling and/or to carry the calls. The signaling processor 422 then determines the cell substitution method based on the call type. For this embodiment, the call processor 422 determines to use white noise for voice calls and repeat last cell for data calls.

In one embodiment of the invention, the signaling processor 422 determines which cell substitution method to use for the call based on the incoming SS7 parameters from the IAM. Some examples of incoming SS7 parameters from the IAM are Calling Party Category, Echo Control Information, and Transmission Medium Requirement.

The signaling processor 422 then generates and transmits a route instruction including the cell substitution method that was determined for the call previously. In other embodiments of the invention, the route instruction could be any control message or instructions for the routing system 424. Subsequent signaling messages for call set up are not shown for the sake of clarity. The routing system 424 receives the route instruction including the cell substitution method from the signaling process 422. The routing system 424 uses the cell substitution method for lost or misinserted cells for the duration of the call. The routing system 424 then receives the call from the local telephone company 110 over the call link 112. The routing system 424 routes the call to the ATM network 130 based on the route instruction.

Figure 6:
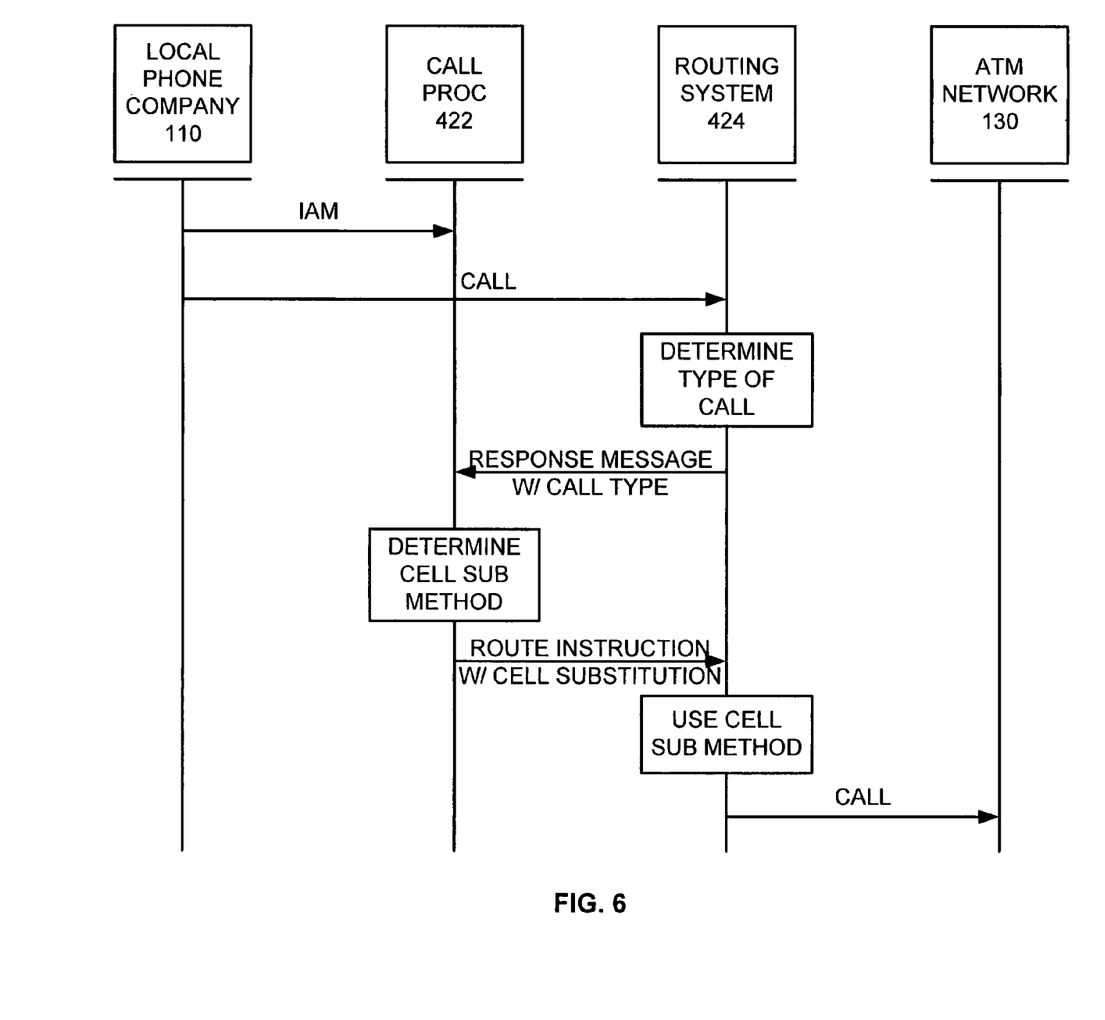
FIG. 6 is a message sequence chart for a cell substitution method selected from a call type from a routing system in an example of the invention.

In another embodiment of the invention, FIG. 6 depicts a message sequence chart for a cell substitution method selected from a call type from the routing system 424 in an example of the invention. The local telephone company 110 transmits an IAM for a call to the signaling processor 422. The routing system 424 receives the call from the local telephone company 110. The routing system 424 then determines the call type based on the call. The routing system 424 generates and transmits a response message including the call type to the call processor 422. The call processor 422 receives and processes the response message.

The call processor 422 then determines the cell substitution method based on the call type. The call processor 422 generates and transmits a route instruction including the cell substitution method to the routing system 424 based on the L&M. The routing system 424 uses the cell substitution method for lost or misinserted cells for the duration of the call. The routing system 424 routes the call to the ATM network 130 based on the route instruction.

Figure 7:
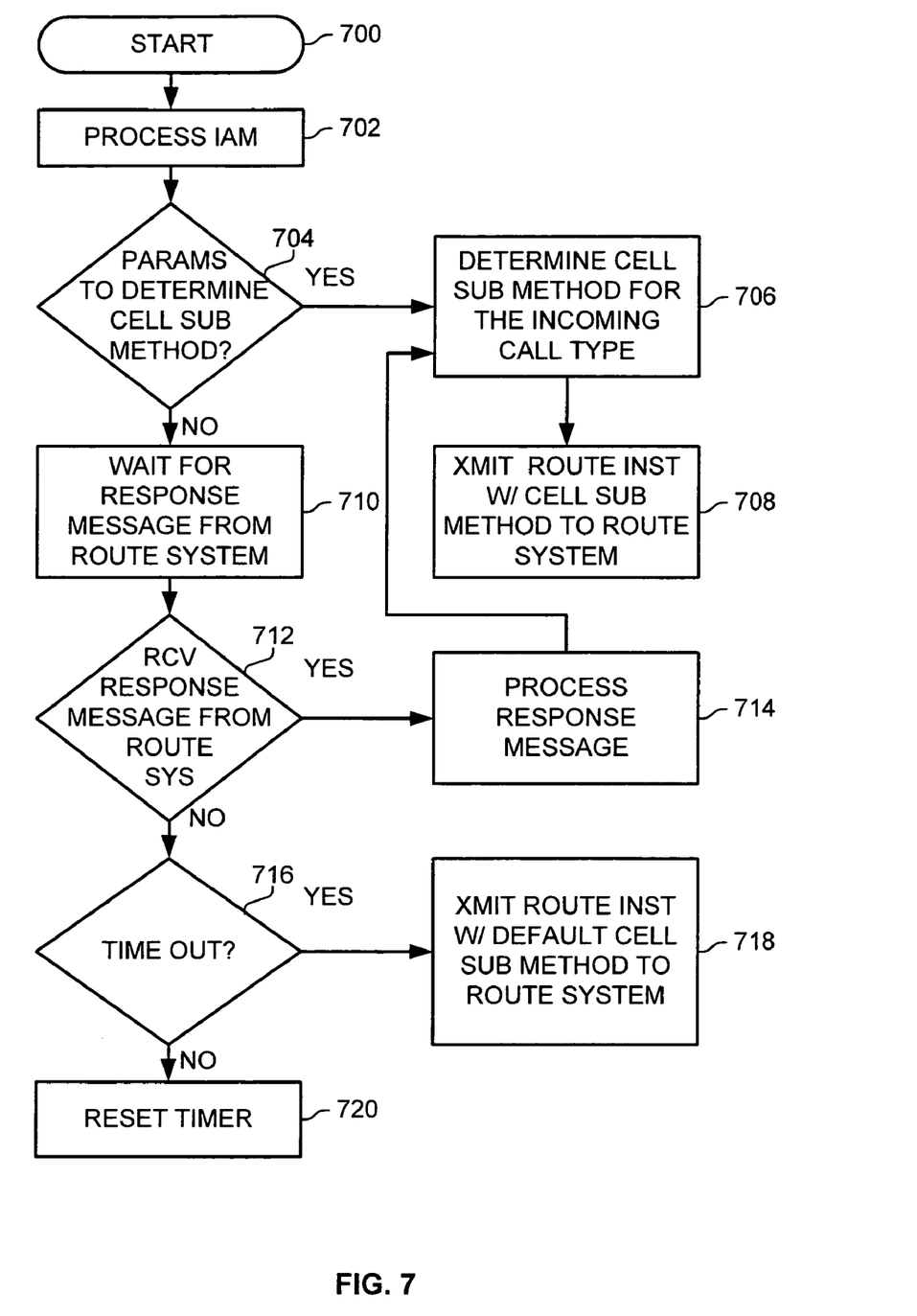
FIG. 7 is a flow chart for a signaling processor in an example of the invention.
Figure 8:
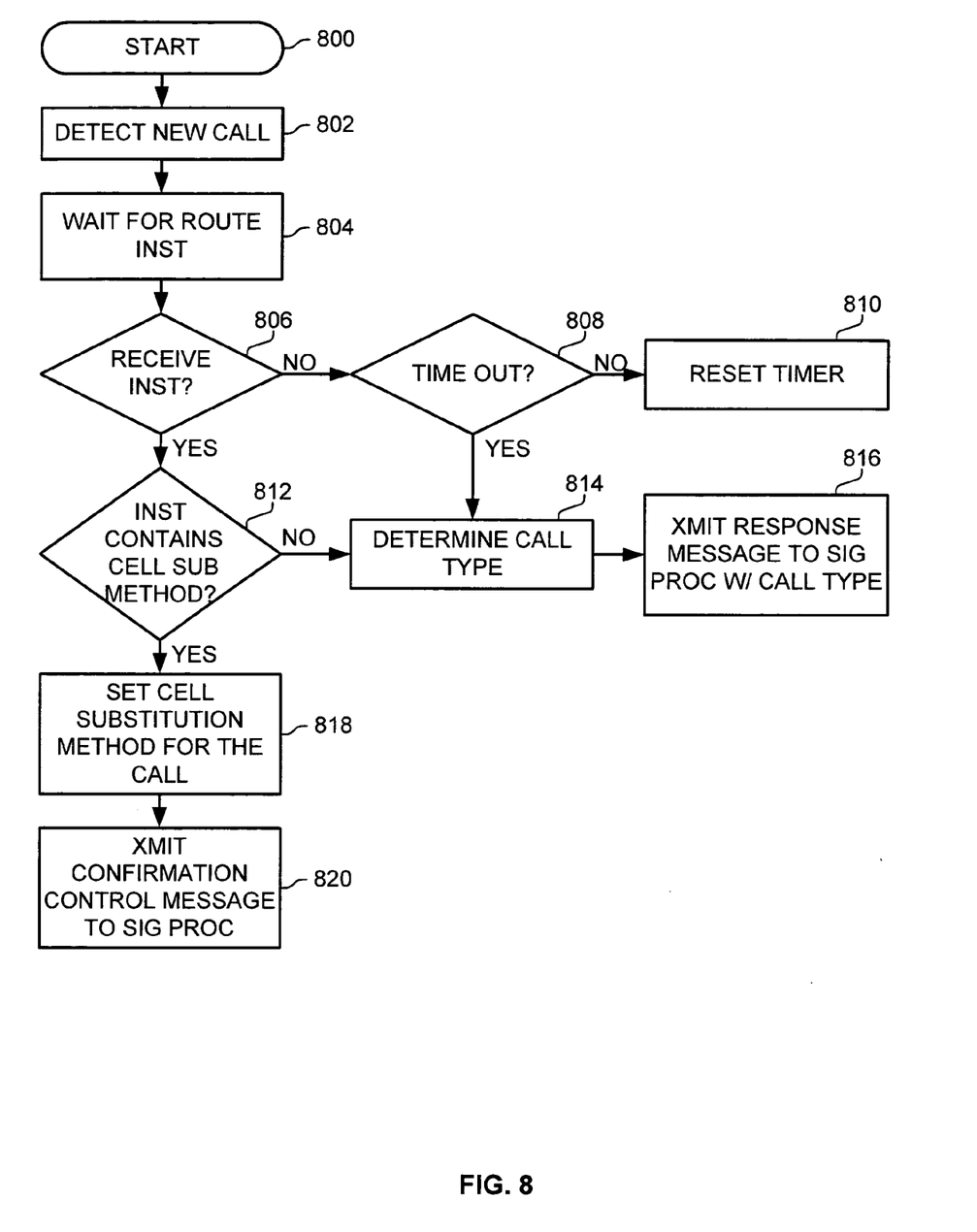
FIG. 8 is a flow chart for a routing system in an example of the invention.

FIGS. 7-8 disclose an embodiment of the invention that supports selecting the cell substitution method from either an initial address message or a control message from the routing system 424. FIG. 7 depicts a flow chart for the signaling processor 422 in an example of the invention. FIG. 7 begins in step 700. The signaling processor 422 processes the LAM for the call from the local telephone company 110 in step 702. In step 704, the signaling processor 422 checks whether the IAM parameters exist to determine the cell substitution method.

If the IAM parameters exist, the signaling processor 422 determines the cell substitution method based on the incoming call type and the IAM parameters in step 706. In step 708, the signaling processor 422 transmits a route instruction including the cell substitution method to the routing system 424.

If the IAM parameters do not exist, the signaling processor 422 waits for the response message from the routing system 424 in step 710. In step 712, the signaling processor 422 checks if the signaling processor 422 received the response message from the routing system 424. If the signaling processor 422 received the response message, the signaling processor 422 processes the response message in step 714 before proceeding to step 706. If the signaling processor 422 has not received the response message, the signaling processor 422 checks if a timer has expired for waiting for the response message in step 716. If the timer has expired, the signaling processor 422 transmits the route instruction including a default cell substitution method to the routing system 424 in step 718. If the timer has not expired, the signaling processor 422 resets the timer in step 720.

FIG. 8 depicts a flow chart for the routing system 424 in an example of the invention. FIG. 8 begins in step 800. In step 802, the routing system 424 detects a new call from the call link 112. In step 804, the routing system 424 waits for a route instruction from the signaling processor 422. The routing system 424 checks if the route instruction was received from the signaling processor 422 in step 806.

If the routing system 424 did not receive the route instruction, the routing system 424 checks if a timer has expired for waiting for the route instruction in step 808. If the timer has not expired, the routing system 424 resets the timer in step 810. If the timer has expired, the routing system 424 determines the call type from the call via the call link 112 in step 814. The routing system 424 then transmits the response message including the call type to the signaling processor 422 in step 816.

If the routing system 424 did receive the route instruction, the routing system 424 checks if the route instruction includes the cell substitution method in step 812. If the route instruction does not include the cell substitution method, the routing system 424 determines the call type from the call via the call link 112 in step 814 before proceeding to step 816. If the route instruction does include the cell substitution method, the routing system 424 sets to use the cell substitution method for the call in step 818. The routing system 424 then transmits a confirmation control message to the signaling processor 422 in step 820.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a communication system having a plurality of packet network routes and a plurality of packet substitution methods, the method comprising:
    receiving a set-up signaling message for a call into a signaling processor;
    in the signaling processor, processing the set-up signaling message to select one of the packet network routes for the call;
    in the signaling processor, processing the set-up signaling message to select one of the packet substitution methods for the call;
    in the signaling processor, generating a control message for the call indicating the selected packet network route and the selected packet substitution method;
    transferring the control message for the call from the signaling processor;
    in a routing system, receiving the control message for the call;
    in the routing system, receiving user communications for the call, and in response to the control message, transferring the user communications using the selected packet network route; and
    in the routing system, in response to the control message, implementing the selected packet substitution method to handle lost packets for the call.

2. The method of claim 1 wherein processing the set-up signaling message to select the selected packet substitution method for the call comprises processing a calling party category in the set-up signaling message for the call.

3. The method of claim 1 wherein processing the set-up signaling message to select the selected packet substitution method for the call comprises processing echo control information in the set-up signaling message for the call.

4. The method of claim 1 wherein processing the set-up signaling message to select the selected packet substitution method for the call comprises processing a transmission medium requirement in the set-up signaling message for the call.

5. The method of claim 1 wherein the set-up signaling message for the call comprises an Initial Address Message (IAM).

6. The method of claim 1 wherein the set-up signaling message for the call comprises an Integrated Services Digital Network (ISDN) message.

7. The method of claim 1 wherein the set-up signaling message for the call comprises Channel Associated Signaling (CAS).

8. The method of claim 1 wherein the selected packet substitution method comprises white noise substitution.

9. The method of claim 1 wherein the selected packet substitution method comprises silence substitution.

10. The method of claim 1 wherein the selected packet substitution method comprises last packet substitution.

11. A communication system having a plurality of packet network routes and a plurality of packet substitution methods, the communication system comprising:
    a signaling processor configured to receive a set-up signaling message for a call, process the set-up signaling message to select one of the packet network routes for the call, process the set-up signaling message to select one of the packet substitution methods for the call, generate a control message for the call indicating the selected packet network route and the selected packet substitution method, and transfer the control message for the call from the signaling processor; and
    a routing system configured to receive the control message for the call, receive user communications for the call, transfer the user communications using the selected packet network route in response to the control message, and implement the selected packet substitution method to handle lost packets for the call in response to the control message.

12. The communication system of claim 11 wherein the signaling processor is configured to process a calling party category in the set-up signaling message to select the selected packet substitution method for the call.

13. The communication system of claim 11 wherein the signaling processor is configured to process echo control information in the set-up signaling message to select the selected packet substitution method for the call.

14. The communication system of claim 11 wherein the signaling processor is configured to process a transmission medium requirement in the set-up signaling message to select the selected packet substitution method for the call.

15. The communication system of claim 11 wherein the set-up signaling message for the call comprises an Initial Address Message (IAM).

16. The communication system of claim 11 wherein the set-up signaling message for the call comprises an Integrated Services Digital Network (ISDN) message.

17. The communication system of claim 11 wherein the set-up signaling message for the call comprises Channel Associated Signaling (CAS).

18. The communication system of claim 11 wherein the selected packet substitution method comprises white noise substitution.

19. The communication system of claim 11 wherein the selected packet substitution method comprises silence substitution.

20. The communication system of claim 11 wherein the selected packet substitution method comprises last packet substitution.

* * * * *